(12) United States Patent
Cleveland et al.

(10) Patent No.: US 7,281,547 B2
(45) Date of Patent: Oct. 16, 2007

(54) MULTI-LAYERED FLEXIBLE TUBE

(75) Inventors: Rafael L. Cleveland, Summerfield, FL (US); Andrew R. Davis, Ocala, FL (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 449 days.

(21) Appl. No.: 10/770,075

(22) Filed: Jan. 31, 2004

(65) Prior Publication Data

US 2005/0170118 A1    Aug. 4, 2005

(51) Int. Cl.
    *F16L 11/00* (2006.01)
(52) U.S. Cl. .............. 138/137; 138/140; 138/141; 138/174; 428/36.91; 428/36.4
(58) Field of Classification Search ............ 138/141, 138/137, 140, 174, 172; 428/36.1, 36.2, 428/36.91, 36.4
See application file for complete search history.

(56) References Cited

U.S. PATENT DOCUMENTS

| | | | | |
|---|---|---|---|---|
| 3,323,962 A | * | 6/1967 | Sprengling et al. ......... | 156/184 |
| 3,358,052 A | | 12/1967 | Archer et al. ............... | 525/131 |
| 3,547,162 A | | 12/1970 | Schaerer ..................... | 138/125 |
| 3,858,617 A | * | 1/1975 | Takada ........................ | 138/141 |
| 3,934,064 A | * | 1/1976 | Lowthian .................... | 428/34.5 |
| 3,972,757 A | | 8/1976 | Derderian et al. ........... | 156/143 |
| 4,035,440 A | | 7/1977 | Khanna et al. .............. | 525/131 |
| 4,098,739 A | | 7/1978 | Westermann ................ | 524/379 |
| 4,130,535 A | | 12/1978 | Coran et al. ................. | 524/487 |
| 4,141,863 A | | 2/1979 | Coran et al. ................. | 525/146 |
| 4,207,404 A | | 6/1980 | Coran et al. ................. | 525/184 |
| 4,226,953 A | | 10/1980 | Coran et al. ................. | 525/193 |
| 4,537,736 A | | 8/1985 | Peltzman et al. ........... | 264/130 |
| 4,624,989 A | | 11/1986 | Berta .......................... | 525/187 |
| 4,644,977 A | | 2/1987 | Arterburn ................... | 138/137 |
| 4,652,475 A | * | 3/1987 | Haney et al. ............... | 138/137 |
| 4,657,049 A | * | 4/1987 | Fourty et al. ............... | 138/133 |
| 4,727,114 A | | 2/1988 | Chen ........................... | 525/239 |
| 4,779,673 A | | 10/1988 | Chiles et al. ................. | 165/45 |
| 5,360,037 A | | 11/1994 | Lindstrom ................... | 138/138 |
| 5,376,723 A | | 12/1994 | Vogt et al. ................... | 525/126 |
| 5,387,648 A | | 2/1995 | Ainsworth ................... | 525/192 |
| 5,397,839 A | | 3/1995 | Patel .......................... | 525/175 |
| 5,398,729 A | | 3/1995 | Spurgat ....................... | 138/133 |
| 5,457,146 A | | 10/1995 | Ogoe et al. .................. | 524/409 |
| 5,476,121 A | | 12/1995 | Yoshikawa et al. ......... | 138/138 |
| 5,488,975 A | | 2/1996 | Chiles et al. ................ | 138/125 |
| 5,523,357 A | | 6/1996 | Peterson ...................... | 525/240 |
| 5,550,190 A | | 8/1996 | Hasegawa et al. ......... | 525/92 A |
| 5,560,398 A | * | 10/1996 | Pfleger ....................... | 138/121 |
| 5,683,773 A | | 11/1997 | Kemper ....................... | 428/36.91 |
| 5,921,285 A | * | 7/1999 | Quigley et al. ............. | 138/125 |
| 6,004,639 A | * | 12/1999 | Quigley et al. ............. | 428/36.3 |
| 6,016,845 A | * | 1/2000 | Quigley et al. ............. | 138/125 |
| 6,074,717 A | | 6/2000 | Little et al. .................. | 428/35.7 |
| 6,142,189 A | | 11/2000 | Bhattacharyya ............. | 138/177 |
| 6,207,752 B1 | | 3/2001 | Abraham et al. ............. | 525/67 |
| 6,300,407 B1 | | 10/2001 | Machleder et al. ......... | 524/515 |
| 6,524,673 B1 | | 2/2003 | Bhattacharyya ............. | 428/36.9 |
| 6,623,822 B2 | | 9/2003 | Bhattacharyya ............. | 428/36.9 |
| 6,899,140 B2 | * | 5/2005 | Fraser et al. ................ | 138/134 |

* cited by examiner

*Primary Examiner*—Patrick F. Brinson
(74) *Attorney, Agent, or Firm*—Joseph V. Tassone; J. Daniel Lykins

(57) ABSTRACT

A multi-layered tube comprising a first inner polymeric tubular structure, a second foamed polymeric structure containing a plurality of short or long reinforcing elements dispersed therein and, optionally, a third cover layer on the outer surface of the reinforcing layer; and a method for manufacturing the multi-layered hose are disclosed.

14 Claims, 2 Drawing Sheets

MULTI-LAYERED FLEXIBLE TUBE

RELATED APPLICATION

Filed concurrently with this application is U.S. Ser. No. 10/770,071 to Cleveland et al. entitled "Multi-Layered Hose".

BACKGROUND OF THE INVENTION

Multiple layered hoses including hoses, which contain foamed and non-foamed layers, are known in the art. For example, U.S. Pat No. 4,644,977 to Arterburn discloses a reinforced lightweight, flexible hose which comprises a two-component tube consisting of a thin, non-foamed inner liner and a foamed interlayer circumferentially encompassing the inner liner; a separate of textile reinforcement telescoped over the two-component tube; and a two-component, coextruded, thermoplastic outer cover layer circumferentially encompassing the reinforced tube, wherein the two-component coextruded thermoplastic outer cover includes a first thermoplastic layer with a multitude of closed gas-filled cells and a second thermoplastic layer which is non-foamed. The second, non-foamed thermoplastic layer has a thickness of from 15% to 73% of the thickness of the first thermoplastic layer and forms the outer surface of the hose. The coextruded first and second thermoplastic layers are specifically characterized as being free of any intervening material.

The present invention relates to tubular structures and particularly to flexible tubular structures such as coolant hoses for use in the automotive industry, and to the manufacture of such tubular structures.

Tubular structures, in general, are constructed from various polymeric materials such as chlorinated polyethylene (CPE); chlorosulfonated polyethylene (CSM); natural rubber; synthetic rubber such as ethylene acrylic copolymer (AEM), styrene-butadiene rubber (SBR), neoprene, ethylene-propylene rubber (EPR), butyl rubber, polybutadiene, polyisoprene, nitrile-butadiene rubber (NBR) polybutylene, ethylene-propylene diene terpolymers (EPDM) and the like; blends of such natural and synthetic rubbers; vulcanizable blends of natural and synthetic rubber; blends of natural and/or synthetic rubbers with. e.g., vinyl resins; and thermoplastic materials such as polyolefins, polyurethanes, etc.

Generally, in order to provide sufficient strength and stability to hoses manufactured from such materials, the manufacturer has to apply a reinforcing layer between the inner tubular structure and the cover layer. For example, U.S. Pat. No. 3,547,162 to Schaerer teaches a synthetic plastic pipe embedded in a rigid building material for use as a water conduit, particular for transporting hot water, wherein the plastic pipe includes an inner crosslinked olefinic polymer; an intermediate reinforcing layer comprising a braided jacket of natural, semi-synthetic or synthetic fibers; and an outer layer of synthetic plastic foam surrounding the intermediate reinforcing layer. The application of the reinforcement greatly increases the complexity of the manufacture process by requiring a separate manufacturing step wherein the inner tubular structure of the hose is cooled in order to apply the reinforcing material and then heated up again before extruding any subsequent layers, resulting in decreased production rates.

Furthermore, specialized machinery, which takes up a considerable amount of critical space, is required to apply the reinforcement. Such machinery requires regular maintenance and needs to be shut down periodically to replenish the reinforcement material. The use of short reinforcement fibers or particles generally overcomes the above problems of needing additional machinery, but the short reinforcement fibers or particles have a tendency to align themselves in a longitudinal direction during conventional extrusion. While the short fibers and/or particles within an extruded bed of material increases the longitudinal strength of the material, they contribute very little to the radial strength of the tube. Therefore, it is a primary object of the present invention to provide a flexible reinforced hose, which has improved radial strength as well as acceptable longitudinal strength to meet the requirements of the automotive industry. It is another object of the invention to provide a reinforced hose, which is more economical and faster to manufacture than previous hoses. It is still another object of the invention to provide a method for manufacturing such flexible reinforced hose without the need for additional equipment, which requires further process steps.

SUMMARY OF THE INVENTION

In accordance with one aspect of the present invention, a multi-layered coolant tube having improved hoop strength when compared to previous hoses and which still meets the current requirements of the automotive industry is constructed from at least two, preferably three separate layers of a polymeric material. The layers of polymeric material comprise a first polymeric tubular structure, a second foamed, reinforcement-containing polymeric material adjacent the outer surface of the first polymeric tubular structure and, preferably a third polymeric cover adjacent the outer surface of the reinforcement-containing polymeric layer. Any suitable polymeric material such as thermoplastic polymers, thermoplastic vulcanizates, and elastomeric polymers may be used in forming any or all of the various layers of the multi-tubular hose.

The thermoplastic material useful in the present invention for forming one or more of the polymeric layers typically comprises polyolefins such as polyethylene, polypropylene, etc.; polyamides, such as nylon; polyesters, chlorinated polyolefins, such as chlorinated polyethylene, chlorinated polypropylene, etc.; chlorosulfonated polyolefins, such as chlorosulfonated polyethylene, chlorosulfonated polypropylene, etc.; polyurethane and the like.

The thermoplastic vulcanizate material useful in the present invention for forming one or more of the polymeric layers typically comprises a polymeric matrix containing an elastomeric material blended therein. For example, the useful thermoplastic vulcanizates include a thermoplastic matrix, e.g., polyolefins such as polyethylene, polypropylene, etc.; polyamides, such as nylon; polyesters, chlorinated polyolefins, such as chlorinated polyethylene, chlorinated polypropylene, etc.; chlorosulfonated polyolefins, such as chlorosulfonated polyethylene, chlorosulfonated polypropylene, etc.; polyurethane and the like which contains a plurality of small, cured elastomeric globules dispersed throughout the thermoplastic matrix. The elastomeric globules include ethylene-propylene-diene monomer, chlorinated polyethylene, chlorinated polypropylene, chlorosulfonated polyethylene, chlorosulfonated polypropylene, styrene-butadiene rubber, nitrile-butadiene rubber, hydrogenated nitrile-butadiene rubber, chloroprene rubber, ethylene-propylene rubber, and acrylic acid ester rubber having a particle size of less than 50 microns.

The elastomeric material used to form any one or more of the layers of the hose of the present invention may be any of the elastomeric materials conventionally used in the manufacture of automotive hoses, e.g., chlorinated polyethylene (CPE); chlorosulfonated polyethylene (CSM); ethylene acrylic copolymers (AEM); natural rubber, synthetic rubber such as styrene-butadiene rubber (SBR), neoprene, ethylene-propylene rubber (EPR), butyl rubber, polybutadiene, polyisoprene, nitrile-butadiene rubber (NBR), polybutylene, ethylene-propylene diene terpolymers (EPDM) and the like; blends of such natural and synthetic rubbers; vulcanizable blends of natural and synthetic rubbers; blends of natural and/or synthetic rubbers with, e.g., vinyl resins; and thermoplastic materials such as polyolefins, polyurethanes, etc.

Each of the first tubular structure, the intermediate reinforcement layer and the cover layer may be formed from the same or from different polymeric materials. The intermediate polymeric material is generally distinguished from the first and third polymeric layers, in that the intermediate polymeric material is a foamed material containing a plurality of reinforcing elements in the form of short or long fibers or elements. The intermediate reinforcement layer preferably contains an adhesive material such as modified polypropylene, e.g., maleated polypropylene available from Atofina, in a sufficient amount to enhance the adherence o the intermediate polymeric material to the reinforcement fibers.

The first tubular structure and the cover may be foamed or non-foamed polymeric materials. In a preferred aspect of the invention, the first inner tubular structure is a solid non-foamed material, the intermediate reinforcement layer is a foamed material and the outer cover layer is foamed or non-foamed. Most preferably, the first inner tubular structure is a solid thermoplastic vulcanizate, the intermediate reinforcement layer is a foamed, mineral reinforced thermoplastic vulcanizate, and the outer cover is a foamed thermoplastic vulcanizate.

In accordance with another aspect of the invention, a method for manufacturing the coolant hose of the present invention comprises extruding the polymeric materials to form the multi-layered coolant hose. The various layers of polymeric material may be extruded simultaneously through the same extruder head or sequentially through different extruder heads. Preferably, the various layers are extruded at the same time in the same head. It has been found that, by extruding the various layers through a single extruder head without the need for additional stations, the production rate of the coolant hose is remarkably increased and the length of the extrusion runs become virtually unlimited, thereby significantly decreasing the complexity and the production costs of the hose.

DETAILED DESCRIPTION OF THE INVENTION

The present coolant hose is a multi-layered construction comprising a first tubular structure having an inner surface and an outer surface; a second polymeric tubular structure having an inner surface and an outer surface wherein the inner surface of the second tubular structure is adhered to the outer surface of the first tubular structure; and a third polymeric tubular structure having an inner surface and an outer surface wherein the inner surface of the third tubular structure is adhered to the outer surface of the second tubular structure. In accordance with the present invention, the second tubular structure, which is intermediate the first tubular structure, and the third tubular structure, is a foamable tubular structure which further comprises a plurality of reinforcement elements in the form of short fibers dispersed therein. It has been found that if the short reinforcement elements are incorporated into a foamable polymeric composition, the foaming action during extrusion causes the reinforcement fibers to orient themselves in a random fashion thereby providing desirable reinforcement in a radial direction as well as in a longitudinal direction.

Figure 1:
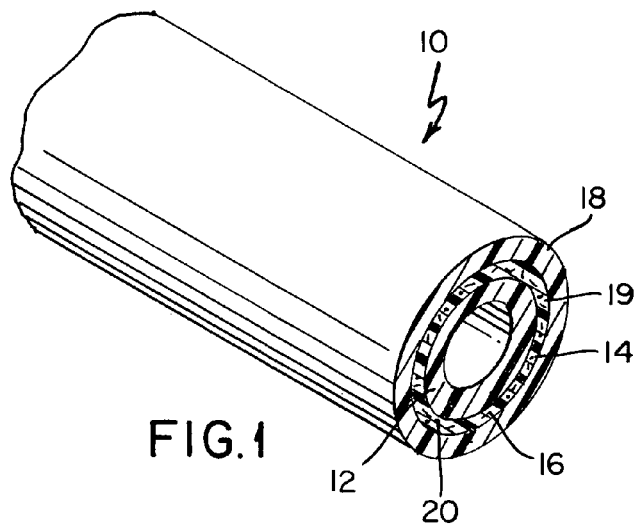
FIG. 1 is a perspective view of the multi-layered hose of the present invention.
Figure 2:
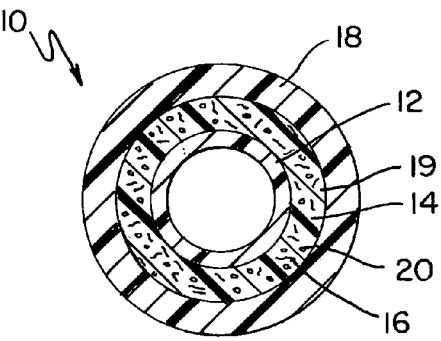
FIG. 2 is a transverse cross-sectional view of one embodiment of the hose of FIG. 1.
Figure 5:
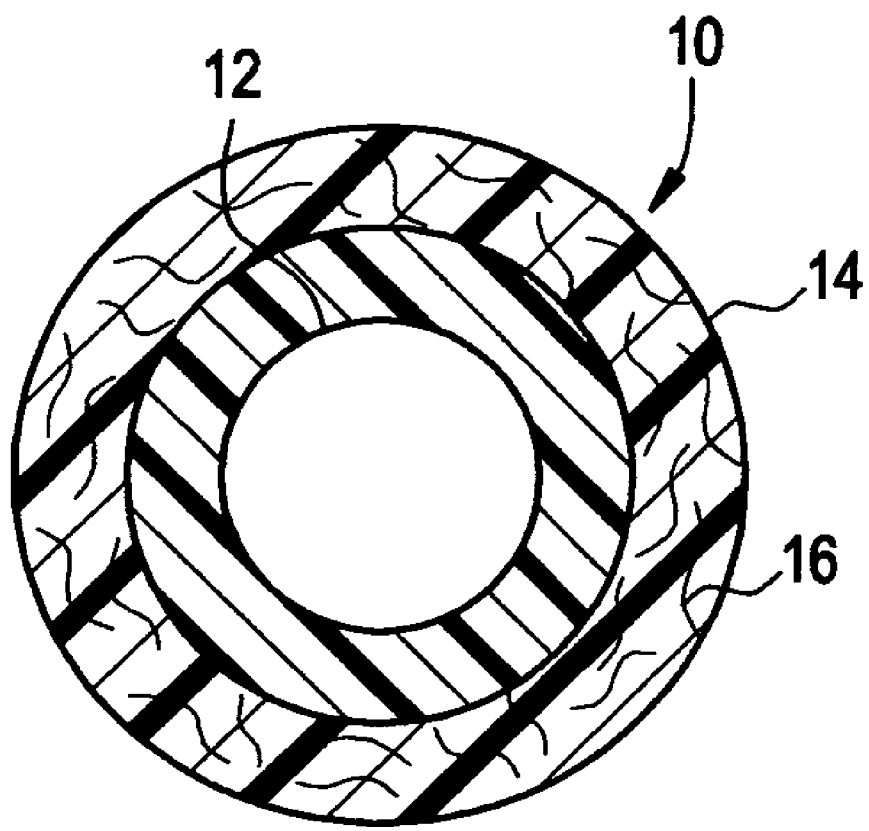
FIG. 5 is a transverse cross-sectional view of still another embodiment of the hose of FIG. 1.

Referring to FIGS. 1, 2 and 5 a hose 10 consists of a polymeric inner tubular structure 12. An intermediate layer 14 of a foamed polymeric material circumferentially encompasses the inner tubular structure 12. The intermediate polymeric layer 14 has dispersed therein a plurality of reinforcing elements 16 in the form of short fibers and/or particle that provides both radial and longitudinal strength and structural integrity to the hose 10. As illustrated in FIGS. 1 and 2, an outer cover layer 18 of a polymeric layer is disposed on the outer surface of the intermediate reinforcing layer 14. As further shown in FIG. 2, the first polymeric inner tubular structure 12, the intermediate reinforcement-containing layer 14 and the third cover layer 18 comprise thermoplastic vulcanizate materials containing a plurality of small, cured, or at least partially cured, elastomeric globules 20 randomly dispersed therein. Typically, the elastomeric globules 20 will be at least about 50% cured and preferably greater than 95% cured. Typically, the elastomeric globules have a particle size of less than about 50 microns dispersed in the thermoplastic vulcanizate polymer matrix 19.

Any of the conventional polymeric materials used in the manufacture of hoses may be employed as the polymeric material used to form the various tubular structures of the present invention. For example, when a thermoplastic material is used to form one or more of the tubular structures of the invention, such thermoplastic material may include polyolefins such as polyethylene, polypropylene, etc.; polyamides, such as nylon; polyesters, chlorinated polyolefins, such as chlorinated polyethylene, chlorinated polypropylene, etc.; chlorosulfonated polyolefins, such as chlorosulfonated polyethylene, chlorosulfonated polypropylene, etc.; polyurethane and the like.

The thermoplastic vulcanizate material used to manufacture the hose of the present invention includes, as the matrix, one or more thermoplastic vulcanizate materials, e.g., polyethylene, polypropylene, polyurethane, polyamide, polyphthalamide, ethylene vinyl acetate copolymers (EVA), acrylonitrile-butadiene-styrene terpolymers (ABS), polyethylene terephthalate (PET), polybutylene terephthalate (PBT), polyvinyl chloride (PVC), polyphenylene (PPE), or polytetrafluoroethylene (PTFE) as a matrix material having, dispersed therein, small globules of a cured or partially cured elastomeric, and the like, as a matrix material having, dispersed therein, small globules of a cured or partially cured elastomeric material such as ethylene-propylene-diene rubber (EPDM), chlorinated polyethylene (CPE), chlorosulfonated polyethylene (CSM), styrene butadiene rubber (SBR), nitrile butadiene rubber (NBR), hydrogenated nitrile butadiene rubber (HNBR), ethylene acrylic copolymers (AEM), fluoroelastomer (FKM), chloroprene rubber (CR), ethylene rubber (EP), polyacrylate (ACM), and the like having a particle size of less than 50 microns.

The reinforcement elements 16 dispersed in the intermediate reinforcement layer include natural or synthetic fibers such as nylon fibers, rayon fibers, aramid fibers, cotton fibers, polyester fibers, glass fibers, carbon fibers, etc.; strands of metal wire, e.g., steel wire; and mineral reinforcements such as wollastonite, glass beads, mica, talc, silica, kaolin calcium carbonate and the like. Typically, the reinforcement elements are short fibers having a length of about 0.012 to 0.050 inches and having a diameter of about 0.004 to 0.24 inches. In certain applications it may be desirable to employ longer fibers. Such fibers may have an average length greater than 0.05 inches wherein most of the fibers are about 0.05 to 2.00 inches long and have a diameter of about 0.004 to 0.024 inches.

The elastomeric globule component of the thermoplastic vulcanizate is cured using on or more conventional curing agents used in the art to cure elastomeric materials. Partial or complete crosslinking of the elastomeric globules can be achieved by adding one or more of such crosslinking agents to the appropriate composition and crosslinking the elastomeric component to the desired degree under conventional crosslinking conditions. The elastomeric component can also be crosslinked by dynamic vulcanization wherein the rubber or elastomer is vulcanized under the conditions of shear at a temperature above the melting point of the thermoplastic polymer component. The elastomeric component is thus simultaneously crosslinked and dispersed as fine globules within the thermoplastic component.

The thickness of the first non-foamed tubular structure is about 25 to 75% of the total thickness of the hose. Preferably, the thickness of the solid inner tubular structure is about 35 to 65% of the total thickness of the hose. The thickness of the foamed intermediate reinforcement-containing layer is approximately 75 to 25% of the total thickness of the hose, while the thickness of the outer cover layer is that which is conventionally used to provide sufficient protection to the hose.

Figure 3:
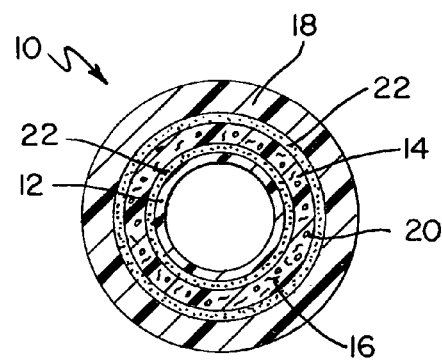
FIG. 3 is a transverse cross-sectional view of another embodiment of the hose of FIG. 1.

Referring to FIG. 3 any or all of the polymeric layers making up the hose of the present invention may be bonded to the appropriate adjacent layer using an adhesive material 22 or treatments. Generally, the techniques and substances used for bonding are designed to satisfy a particular demand on the hose; therefore, it is believed that the invention should not be limited to any specific method for bonding the layers together.

While it is generally preferable to utilize the same thermoplastic polymer material as the matrix for all of the various layers of the thermoplastic vulcanizate of the coolant hose, it is also within the scope of the invention to employ different thermoplastic polymers as the matrix in some or all of the thermoplastic vulcanizates when used in the various layers. For example, the thermoplastic polymer matrix in the inner liner tubular structure may be one thermoplastic polymer, and the thermoplastic polymer matrix in either of the intermediate and cover layers may be of another thermoplastic polymer. Also, the elastomeric component of the thermoplastic vulcanizate may vary from one thermoplastic vulcanizate to another.

The foamed polymers such as the foamed thermoplastic vulcanizates useful in the present invention may be foamed using one or more conventional foam-forming agents, such as chemical blowing agents, dispersed throughout the polymeric material. Generally, the foaming agent is added to the polymeric material in microsphere plastic particles or in pellet form prior to extrusion. Foaming the polymeric materials results in the activation of the foam-forming agent causing the formation of a plurality of minute closed cells spaced within the polymer matrix. Any of the conventional chemical foaming agents may be employed, e.g., a blend of citric acid and sodium bicarbonate, azodicarbonamide, modified azodicarbonamide, hydrazide, 5-phenyltetrazole, p-toluene sulfonylsemicarbazide, N,N'-dinitrosopentamethylenetetramine, benzenesulfonyl hydrazide, p-toluenesulfonyl hydrazide, p,p'-oxybis(benzenesunfonyl hydrazide), and mixtures thereof. Typically, the foamed layers exhibit a specific gravity of about 0.55 to 0.90. In addition to the conventional chemical blowing agents, polymeric materials such as T.V. expanded by water foaming during extrusion, have been effective in providing the foamed structure of the polymer.

Figure 4:
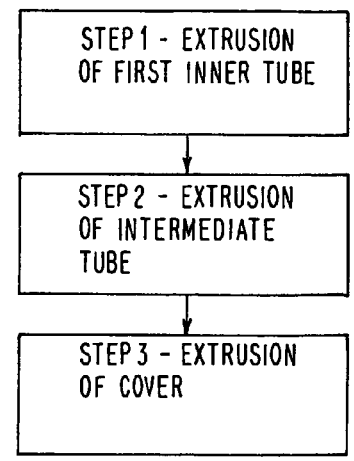
FIG. 4 is a diagram illustrating the various steps employed in the manufacture of the multi-layered hose of the invention.

A method for manufacturing the polymeric coolant hose of the present invention is illustrated in FIG. 4 and further described as follows. In step (1), a first polymeric material is extruded to form a first polymeric tubular structure. Step (2) provides for the extrusion of a second intermediate polymeric layer onto the outer surface of the second intermediate reinforcement-containing polymeric layer. Step (3) provides for the extrusion of a third polymeric outer cover onto the outer surface of the second intermediate reinforcement containing polymeric layer. In a preferred method for manufacturing the coolant hose in accordance with the invention, all of the various layers forming the hose are simultaneously coextruded through the same extruder head. However, it will be noted that, if desired, the various layers may be extruded separately. If desired, an adhesive may be applied between the various layers to increase bonding therebetween.

While certain aspects and embodiments of the present invention have been specifically illustrated and described herein, it will be understood that various other aspects and embodiments, and modifications thereof may be practiced without deviating from the scope of the invention.

What is claimed is:

1. A flexible tube comprising:
    a first tubular structure, said first tubular structure comprising a first polymeric material having an inner circumferential surface providing a path for conveying fluids, and an outer circumferential surface;
    a foamed second tubular structure comprising a second polymeric material containing a plurality of reinforcement elements randomly dispersed therein, said second tubular structure having an inner circumferential surface and an outer circumferential surface, the inner circumferential surface of which is adhered to the outer circumferential surface of said first tubular structure; and
    a third tubular structure comprising a third polymeric material, said third tubular structure comprising a polymeric material having an inner circumferential surface and an outer circumferential surface, the inner circumferential surface of which is adhered to the outer circumferential surface of said second tubular structure.

2. The hose of claim 1 wherein said plurality of reinforcement elements comprises natural fibers, synthetic fibers, or metal wire, mineral elements, or combinations thereof.

3. The hose of claim 2 wherein said plurality of reinforcement elements comprises natural fibers, synthetic fibers or metal wires having a length of about 0.012 to 2.00 inches and a diameter of about 0.004 to 0.024 inch.

4. The hose of claim 3 wherein said plurality of reinforcement elements are natural or synthetic fibers or metal wires having a length of about 0.012 to 0.050 inches and a diameter of about 0.004 to 0.024 inches.

5. The hose of claim 3 wherein said plurality of reinforcement elements are natural or synthetic fibers selected from the group consisting of nylon fibers, rayon fibers, aramid fibers, cotton fibers, polyester fibers, glass fibers, carbon fibers.

6. The hose of claim 2 wherein said plurality of reinforcement elements comprises wollastonite, glass beads, mica, talc, silica, kaolin, calcium carbonate or mixtures thereof.

7. The hose of claim 1 wherein each of said first tubular structure, said second tubular structure and said third tubular structure is a thermoplastic vulcanizate selected from the group consisting of polyethylene, polypropylene; polyurethane, polyamide, polyphthalamide, ethylene vinyl acetate copolymers, acrylonitrile-butadiene-styrene terpolymers, polyethylene terephthalate, polybutylene terephthalate, polyvinyl chloride, polyphenylene, or polytetrafluoroethylene as a matrix material having, dispersed therein, a plurality of small globules of a cured or partially cured elastomeric material selected from the group consisting of ethylene-propylene-diene monomer, chlorinated polyethylene, chlorinated polypropylene, chlorosulfonated polyethylene, chlorosulfonated polypropylene, styrene-butadiene rubber, nitrile-butadiene rubber, hydrogenated nitrile-butadiene rubber, chloroprene rubber, ethylene-propylene rubber, and acrylic acid ester rubber, said plurality of small globules having a particle size of less than 50 microns.

8. The hose of claim 7 wherein said thermoplastic vulcanizate comprises a thermoplastic polypropylene matrix having dispersed therein a plurality of elastomeric ethylene-propylene-diene monomer (EPDM) globules.

9. The hose of claim 1 wherein at least one of said first tubular structure, and said third tubular structure is foamed.

10. The hose of claim 1 wherein said foamed second tubular structure has a specific gravity of about 0.55 to 0.90.

11. A flexible hose for transporting fluids in an automotive coolant system, said hose comprising:
a first tubular structure having an inner surface and an outer surface, wherein said first tubular structure is a thermoplastic vulcanizate comprising a thermoplastic polypropylene matrix having a plurality of EPDM globules dispersed therein;
a second tubular structure having an inner surface and an outer surface, wherein said inner surface of said second tubular structure is disposed on the outer surface of said first tubular structure, wherein said second tubular structure is a foamed thermoplastic vulcanizate comprising a foamed thermoplastic polypropylene matrix having a plurality of EPDM globules dispersed therein, said second foamed thermoplastic vulcanizate tubular structure further comprising a plurality of reinforcement elements if the form of fibers or wires having a length of about 0.012 inches 0.050 inch and a diameter of about 0.004 to 0.024 inches dispersed therein, wherein said second foamed thermoplastic vulcanizate tubular structure has a specific gravity of about 0.55 to 0.90; and
a third tubular structure around second tubular structure, wherein said third tubular structure is a thermoplastic vulcanizate comprising a thermoplastic polypropylene matrix having a plurality of EPDM globules dispersed therein.

12. The hose of claim 11 wherein said plurality of reinforcement elements are in the form of natural or synthetic fibers selected from the group consisting of nylon fibers, rayon fibers, aramid fibers, cotton fibers, polyester fibers, glass fibers, carbon fibers, or combinations thereof.

13. A flexible hose for transporting fluids in an automotive coolant system, said hose comprising:
a first tubular structure having an inner surface and an outer surface, wherein said first tubular structure is a thermoplastic vulcanizate comprising a thermoplastic polypropylene matrix having dispersed therein a plurality of EPDM globules;
a second tubular structure having an inner surface and an outer surface, said inner surface of said second tubular structure being disposed on the outer surface of said first tubular structure, wherein said second tubular structure is a foamed thermoplastic vulcanizate comprising a thermoplastic polypropylene matrix having a plurality of EPDM globules dispersed therein, said second thermoplastic vulcanizate tubular structure further comprising a plurality of reinforcement minerals selected from the group consisting of wollastonite, glass fibers, carbon fibers, glass beads, mica, talc, silica kaolin, calcium carbonate and mixtures thereof dispersed therein, said foamed second tubular structure has a specific gravity of about 0.55 to 0.90; and
a third tubular structure around said second tubular structure, wherein said third tubular structure is a foamed thermoplastic vulcanizate comprising a foamed thermoplastic polypropylene matrix having a plurality of EPDM globules dispersed therein, said third tubular structure having a specific gravity of about 0.55 to 0.90.

14. The hose of claim 1 further comprising an adhesive material between at least one of said first tubular structure and between said second tubular structure and said third tubular member.

* * * * *